United States Patent Office 2,934,861
Patented May 3, 1960

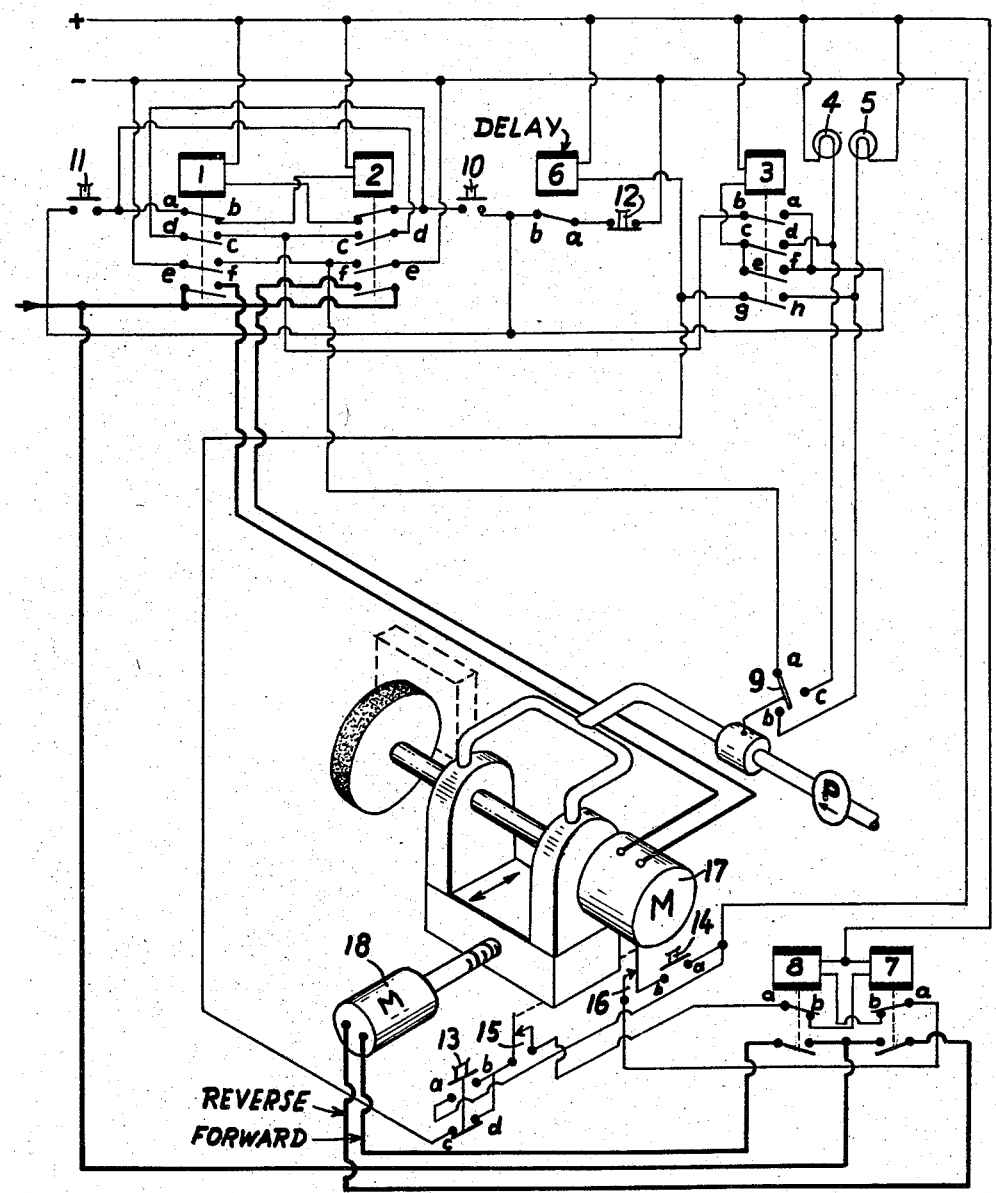

---

2,934,861

PROTECTION OF MACHINE TOOLS

Karl Engel, Siegen, Westphalia, Germany

Application December 22, 1954, Serial No. 477,044

Claims priority, application Germany January 2, 1954

6 Claims. (Cl. 51—2)

This invention relates to protective gear for machine tools. It is common to provide a machine tool with one or more protective switches which stop the machine in the event of an untoward occurrence or other abnormal condition. Merely to stop the machine in this way leaves the tool in contact with the workpiece and this in itself may be a disadvantage with undesirable consequences to the tool or the workpiece.

According to the present invention a delay relay is included between the or each protective switch and the switch which stops the operation of the machine; simultaneously, means is set in action to separate the tool from the workpiece so that by the time the machine is stopped the tool and workpiece will be out of contact.

A particular application of the invention is to grinding machines and for convenience it will be further described with reference to such.

The main bearing in a grinding machine, particularly in a heavy grinding machine such as a roll grinding machine is, as a rule, lubricated by circulation of oil. The oil is led to the bearing through a pipe from a pump arranged outside the bearing and after passing through the bearing reaches a reservoir from which it is drawn by the pump and again delivered to the bearing.

If the oil supply is interrupted whether through failure of the pump, stoppage of the pipes or unnoticed emptying of the reservoir, the bearing is endangered. For such cases, an oil supervising switch is provided in the circulating system usually immediately in front of the point at which the oil enters the bearing.

According to the construction by means of the supervising switch under the action of the oil flow a circuit is opened or closed. This circuit is connected with the protective gear for the main drive and switches this off upon failure of the flow of oil. There is, however, the further danger that the grinding wheel running down and then coming to rest which remains in contact with the workpiece, is damaged or even destroyed by the continuing movement of the workpiece.

When such a machine is equipped according to the present invention, the impulse from the supervising switch through a delay relay first causes the grinding wheel to be withdrawn a little from the workpiece, then causes the movement of the workpiece to be stopped and thereupon stops the drive of the grinding wheel.

The known signal device may be provided so that the progress of these operations can be watched, for example, a green lamp which is illuminated during regular operation, and a red lamp which is illuminated when a fault arises which sets the protective gear in operation.

By way of example, a circuit in accordance with the invention is shown in the accompanying drawing.

In the drawing:

1 is the contactor for low speed of rotation of the grinding wheel motor which is of the pole changing type.

2 is the contactor for the high speed of rotation of the grinding wheel motor.

3 is an auxiliary contactor.

4 is a green signal lamp for indication that the oil is circulating.

5 is a red signal lamp to indicate failing of oil circulation.

6 is the delay relay.

7 is a contactor for rapid withdrawal of the grinding wheel.

8 is a contactor for the rapid forward feed of the grinding wheel.

9 is the oil circulation supervising switch.

10 is a press button for switching the grinding wheel motor on at low speed.

11 is a press button for switching on the grinding wheel motor at high speed.

12 is a press button for switching off the grinding wheel motor.

13 is a press button for retraction of the grinding wheel.

14 is a press button for feeding the grinding wheel forwards.

15 is a limit switch for the withdrawal movement of the grinding wheel.

16 is a limit switch for the forward movement of the grinding wheel.

17 is the grinding wheel motor here by way of example of the pole changing type.

18 is the feed motor of the grinding wheel carriage for moving the grinding wheel radially in relation to the workpiece.

The circuit illustrated operates in the following manner.

At rest all the contactor and relay windings are unexcited. The press button switch 12, the contacts 3c–d and the contacts 6a–b are all closed. Pressing button 10 or 11 closes the exciting circuit of contactor 1 or 2 which over the contacts 1m–n or 2m–n starts motor 17 and over contacts 1e–f or 2e–f establishes a supply to the supervising switch 9 which through contacts 9a–b causes the red lamp 5 to be illuminated. As soon as the motor 17 is running if the oil circulation is correctly established the switch 9 responds. The switch opens its contacts a–b thus extinguishing the red lamp 5 and by closing its contacts a–c switches on the green lamp 4 and also closes the exciting circuit of the auxiliary contactor 3 through the contacts 3c–d. As soon as contactor 3 responds its contacts f–e close before its contacts 3c–d open and it is held on by the circuit closed through its contacts e–f but it is now independent of the switch 9. The operation of the contactor 3 also completes a holdon circuit for the contactor 1 or 2 through the contacts 3a–b and 1c–d or 2c–d. Finally, the contactor 3 by closing the contacts 3g–h prepares a circuit through which the relay 6 and the contactor 7 circuits can be closed but the circuits thus prepared are at present open at the contact b of the switch 9. Once this position has been reached, the press button 10 or 11 can be released as the contactor 1 or 2 is held on as above described.

During operation button 13 enables the grinding wheel carriage to be moved rapidly backward by excitation of contactor 7 which sets motor 18 in operation in the appropriate direction through contacts 7m–n. Button 14 enables the grinding wheel carriage to be moved rapidly forwards by exciting contactor 8 having contacts 8m–n for the appropriate direction of rotation for the motor 18. If button 13 or 14 is held on after the grinding wheel carriage has reached the permissible limit of its travel, the corresponding limit switch 15 or 16 stops it from moving any further.

If the oil flow fails, for example through stoppage of the pipe line or loss of oil, the switch 9 automatically returns to its rest position, switches on the red lamp 5 through contacts 9a–b and through the contacts 3g–h of the auxiliary circuit breaker 3 excites the delay relay 6 and also the contactor 7 through the contacts c–d of the press button 13.

The feed motor 18 immediately rapidly withdraws the still running grinding wheel from the workpiece. After the delay to which the delay relay 6 has been set, the contacts a–b of this relay open and by de-energising the contactor 1 or 2 cause the grinding wheel motor 17 to be switched off. At the same time, the auxiliary contactor 3 is de-energised, the contacts g–h of which open the circuit of the contactor 7 and thus of the feed motor 18 which had withdrawn the grinding wheel. All the parts now return to the starting position above described.

If the grinding wheel motor 17 is switched on again by pressing one of the buttons 10, 11, without first rectifying the fault, the switch 9 does not respond, the red lamp 5 is continuously illuminated and the contactor 3 remains unenergised. Upon releasing the press button 10 or 11 therefore the driving motor 17 is switched off because the contacts a—b of the auxiliary contactor 3 will have remained open so that there is no supply for holding on the contactor 1 or 2.

The contactor 1 has locking contacts a—b in the circuit of the contactor 2 and the contactor 2 has locking contacts a—b in the circuit of contactor 1. These prevent both contactors being excited simultaneously. The same applies to the locking contacts 7a–b, 8a–b in the circuits of contactors 8 and 7. The contacts c–d of the press button 13 ensure that when this press button is actuated the motor 18 continues running in the withdrawal direction irrespective of the action of the switch 9 and the contactor 3.

Naturally, the invention is not limited to this example of embodiment, but can be used generally where a machine tool is provided with a protecting circuit which stops the machine on the occurrence of some fault. In all these cases it is desirable, or even necessary, to bring the tool out of engagement with the workpiece before the machine comes to rest. In the case of machine tools in which the workpiece itself is moved it is similarly desirable to cause the workpiece to be withdrawn from the tool, for example in the case of a planing machine to run the table right away and bring it to rest in one of its extreme end positions. If there are several protective switches or relays the invention is advantageously so applied that the separation of the tool and the workpiece occurs in every case independently of which relay or switch has been actuated. Since all of these relays or switches ultimately control the driving motor, it is simply a matter of including the delay relay and associated parts on the lines described above with the circuit breaker of the driving motor and the means for separating the tool and workpiece.

I claim:

1. In a machine tool having electrical drive and a supervising switch for stopping the drive on the occurrence of an abnormal condition in the operation of the machine, the combination of a delay relay controlled by said supervising switch and in turn controlling the electrical drive, whereby the stopping of the drive is delayed for a corresponding period after the supervising switch has operated, and electrical means controlled by said supervising switch for separating the tool and workpiece within the delay period of said relay.

2. In a machine tool having electrical drive and a supervising switch for stopping the drive on the occurrence of an abnormal condition in the operation of the machine, the combination of electrically operated feeding means for bringing the tool and workpiece out of engagement, a contactor controlling the supply to the electrical drive and to said feeding means, a direct connection from said supervising switch to said feeding means whereby the tool and workpiece are separated immediately said supervising switch responds to the occurrence of an abnormal condition, a delay relay connected between said supervising switch and said contactor whereby after a corresponding delay after said supervising switch has responded to an abnormal condition said relay causes said contactor to open thereby stopping both the machine drive and the action of said feeding means.

3. In a machine tool having electrical drive, an oil circulating system and an electric switch responsive to the failure of the oil circulation, the combination of electrically controlled feed means for separating the tool and workpiece, said feed means being directly controlled by said switch whereby the tool and workpiece are separated immediately upon the actuation of said switch by failure of the oil circulation, a contactor controlling the drive of the machine and a delay relay connected between said switch and said contactor whereby when said switch is actuated by failure of the oil circulation said contactor stops the drive of the machine after a delay determined by said relay.

4. Protective controlling means for an electrically driven metal working machine having oil circulation for the main bearing and a supervising switch responsive to the failure of the oil circulation, comprising a first contactor for the main driving motor, a feed motor which when actuated in one direction withdraws the metal working tool from the workpiece, a second contactor which when excited sets said feed motor in operation in said direction, a delay relay having contacts which when the relay is excited at the end of the delay period open the circuit of said first contactor, an auxiliary contactor the exciting circuit of which is closed through the closing of said delay relay contacts and through contacts closed by said supervising switch when normal oil circulation is established, said auxiliary contactor also having contacts through which it is connected with said supervising switch and which it itself opens, hold-on contacts which it closes before opening said last-mentioned contacts, and preparing contacts which it closes and through which a circuit through said delay relay is prepared, and another circuit to said second contactor is prepared, and a contact on said supervising switch which in the position of said switch corresponding to failure of the oil circulation completes the supply circuit to said preparing contacts.

5. In a machine metal working tool of the kind having a power-driven working tool, and power operated means for withdrawing said tool from working relationship to a workpiece, and of the kind which includes interconnected supervisory control means to interrupt the power drive for the tool upon occurrence of an abnormal working condition; the improvement which comprises a time delay device connected for control by said control means to delay the action of said control means in interrupting the power drive for the tool, and means directly and immediately controlled by said control means for initiating immediate operation of said power operated means for withdrawing said tool, whereby the tool is withdrawn from the workpiece prior to interruption of the tool drive.

6. A machine tool of the class described in claim 5, including means controlled by said delay device for additionally interrupting the drive of the power-driven working tool.

References Cited in the file of this patent

UNITED STATES PATENTS

| | | |
|---|---|---|
| 2,143,533 | Archea et al. | Jan. 10, 1939 |
| 2,251,607 | Astrowski et al. | Aug. 5, 1941 |
| 2,427,064 | Moul | Sept. 9, 1947 |
| 2,526,796 | Asbridge | Oct. 24, 1950 |
| 2,675,514 | Smith | Apr. 13, 1954 |